S. A. MATARAZZO.
TIRE.
APPLICATION FILED SEPT. 18, 1911.
1,030,263.
Patented June 18, 1912.
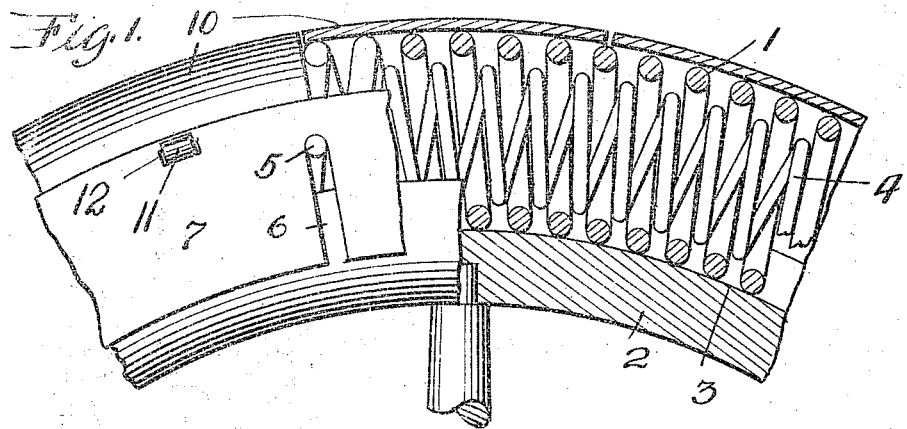
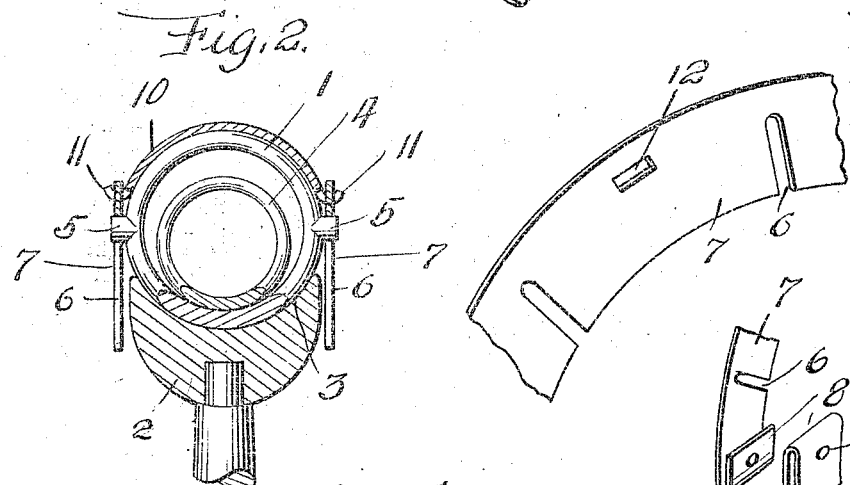
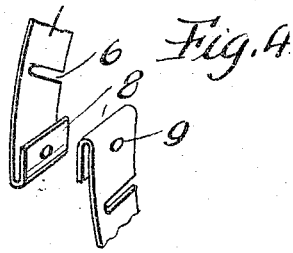
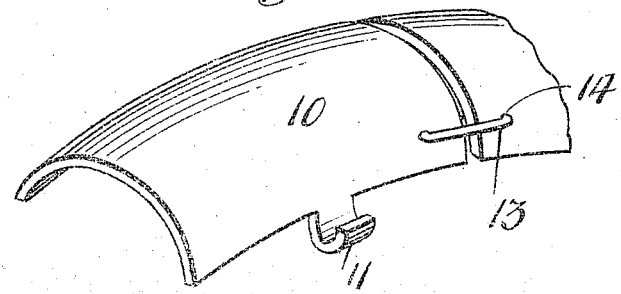
WITNESSES
Samuel Payne
Ralph C. Everett
INVENTOR
S. A. Matarazzo.
BY
ATTORNEYS

UNITED STATES PATENT OFFICE.

STEPHEN A. MATARAZZO, OF WILMERDING, PENNSYLVANIA.

TIRE.

1,030,263.

Specification of Letters Patent.

Patented June 18, 1912.

Application filed September 15, 1911. Serial No. 649,055.

*To all whom it may concern:*

Be it known that I, STEPHEN A. MATARAZZO, a citizen of the United States of America, residing at Wilmerding, in the county of Allegheny and State of Pennsylvania, have invented certain new and useful Improvements in Tires, of which the following is a specification, reference being had therein to the accompanying drawing.

This invention relates to tires for automobile and other vehicles, and the objects of my invention are to obviate the necessity of using pneumatic tubes, and to furnish a wheel with a cushion tire that is non-penetrable under ordinary conditions.

Further objects of my invention are to provide a resilient and yieldable tire that can be advantageously used in connection with large trucks, and to accomplish the above results by a tire consisting of comparatively few parts readily assembled and maintained at a comparatively small cost.

With the above and other objects in view the invention resides in the novel construction, combination and arrangement of parts to be hereinafter specifically described and then claimed.

Reference will now be had to the drawing, wherein there is illustrated a preferred embodiment of the invention, but it is to be understood that the invention is susceptible to such changes as fall within the scope of the appended claims.

In the drawing:—Figure 1 is a side elevation of a portion of the tire, partly broken away and partly in section. Fig. 2 is a cross-sectional view of the tire. Fig. 3 is a perspective view of a portion of one of the side plates thereof. Fig. 4 is a similar view illustrating the ends of a side plate; and Fig. 5 is a similar view illustrating a shoe adapted to form part of the tire.

A tire in accordance with this invention comprises an outer spirally coiled spring 1 arranged circumferentially of a wheel felly or rim 2, said felly having the periphery thereof concave, as at 3, to provide a seat for the convolutions of the spring 1. Arranged within the convolutions of the spring 1 is a small spirally coiled spring 4 coöperating with the spring 1 in providing a peripheral cushion for the vehicle wheel.

Certain convolutions of the spring 1 are provided with oppositely disposed and outwardly projecting pins 5 engaging in radially disposed slots 6 provided therefor and equally spaced in circumferentially arranged side plates 7. Each side plate has the ends thereof hook-shaped, as at 8, to interlock, said interlocked ends being screwed together by rivets or other fastening means extending through openings 9 provided therefor in the hook-shaped ends of the side plate.

Arranged upon the outer spring 1 are shoes or tread pieces 10, and these tread pieces have the longitudinal edges thereof provided with hooks 11 adapted to engage in slots 12 formed in the side plates 7. The shoes 10 have the ends thereof connected by links 13 extending through openings 14 formed in said shoes, adjacent to the longitudinal edges thereof.

The tire in its entirety is preferably made of light and durable metal, and even should the shoes of the tire be punctured or pierced, the resiliency of the tire is not impaired, and this is equally so should one of the shoes be injured. The parts of the tire are easily assembled and maintained in a operatable condition.

What I claim is:—

1. A tire comprising coiled springs arranged circumferentially, one within the other, shoes arranged upon the outer spring, pins carried by said outer spring, and side plates arranged upon said pins and engaging said shoes.

2. A tire comprising coiled springs, one arranged within the other, pins carried by the outer spring, slotted side plates arranged upon said pins, and shoes arranged upon the outer spring and having connection with said side plates.

3. A tire comprising coiled springs circumferentially arranged one within the other, oppositely disposed pins carried by some of the convolutions of the outer spring, slotted side plates arranged upon said pins and each plate having hook-shaped interlocked ends, shoes arranged upon the outer spring, and hooks carried by the longitudinal edges of said shoes and engaging in said side plates.

In testimony whereof I affix my signature in the presence of two witnesses.

STEPHEN A. MATARAZZO.

Witnesses:
CHRISTINA T. HOOD,
MAX H. SROLOVITZ.